Sept. 5, 1933.   W. VAN B. ROBERTS   1,925,570
MEANS FOR INTENSIFYING THE DIRECTIONAL CHARACTERISTIC OF DIRECTIVE ANTENNÆ
Filed March 8, 1929
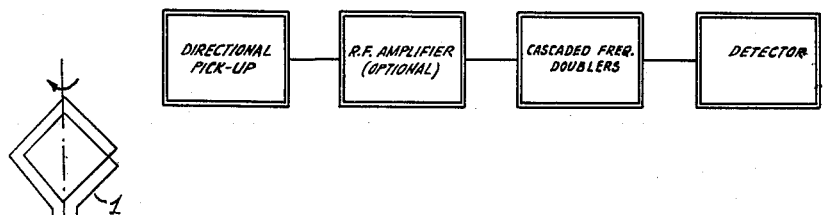
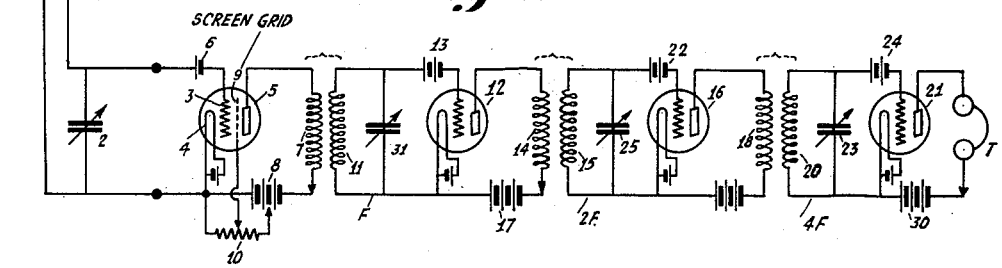
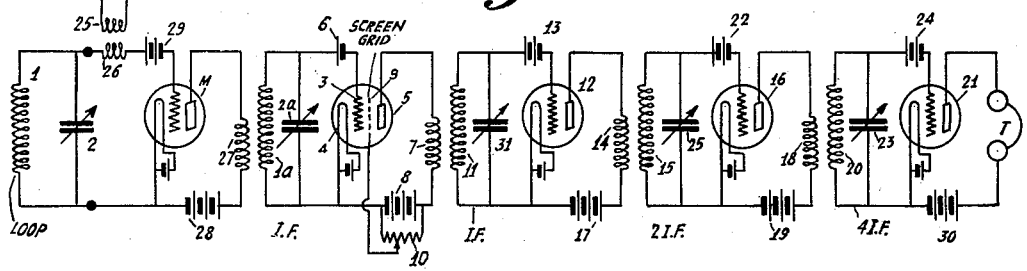
Inventor
WALTER VAN B. ROBERTS
By his Attorney

UNITED STATES PATENT OFFICE 1,925,570

MEANS FOR INTENSIFYING THE DIRECTIONAL CHARACTERISTIC OF DIRECTIVE ANTENNÆ

Walter van B. Roberts, Princeton, N. J., assignor to Radio Corporation of America, a corporation of Delaware Application March 8, 1929. Serial No. 345,424

4 Claims. (Cl. 250—11)

This invention relates to receiving apparatus to be used with any type of directional antenna and in particular with directional antenna of that type which utilizes a rotatable closed inductance to pick up signal voltage.

Directional receivers in general use today, usually include a radiant energy pickup device of the above type for obtaining the direction of the signal source, means for associating the signal voltage received in said inductance with receiving apparatus which usually includes a detector and an aural indicating device, and means for introducing into the pickup device or receiver input a vertical aerial component to obtain a sense of direction in the receiver output.

Usually, in apparatus of this type, when the signal voltage pickup device is rotated to such a position that its plane is at right angles to the source of signal voltage, the output of the detector as indicated in the indicating device is at minimum while, when the signal voltage pickup device is rotated to a position such that its plane is in the line of the signal energy the output of the receiving apparatus associated therewith is maximum. In some instances the position of the pickup device which gives maximum response in the indicating device is used to determine the direction of the source of radiant energy while in other instances the position of the pickup device which gives minimum response is utilized to obtain the direction of the source of energy. In either case the greater the change in the output of the receiver per degree departure of the signal voltage pickup device from the position giving maximum or minimum response in the pickup device and in the output of the receiving apparatus the greater the accuracy with which the true position of the source of radiant energy may be determined.

For instance, suppose it is desired to locate a loop antenna at the position of maximum pickup with reference to the source of radiant energy. This cannot be done with precision because the signal voltage in the pickup device or loop falls off a very small amount when the loop is rotated through a considerable angle in either direction from the true pointing position and consequently the output of the detector of the receiving apparatus associated with the loop antenna likewise varies but little over a considerable angular variation of the loop about the true maximum pointing position of the loop. Likewise when the point of zero response is utilized to ascertain the direction of the signal voltage source the signal voltage in the loop and the response in the output increases but a small amount when the loop is rotated through a considerable angle in either direction from the position at which no signal voltage is induced in the loop.

Briefly and broadly the object of this invention is to provide means for causing a greater percentage change in the detector output of the receiver associated with the signal voltage pickup device than is caused in the signal voltage induced in the pickup device when it is oriented from the true pointing position.

Another object of this invention is to provide a device of the above character which can be utilized without alteration in the receiver or in the pickup device with all directional aerial pickup devices of any type known at present.

This is accomplished by the use of novel apparatus interposed between the signal voltage pipkup device and the indicating device which will greatly increase the percentage of change in response in the indicating device with respect to the percentage of change of voltage in the directional antenna.

According to this invention the signal energy from the pickup device is amplified the required amount, passed through a succession of frequency doublers and then fed to the input circuit of the detector. In this manner due to the fact that the output voltage of a frequency doubler is substantially proportional to the square of the amplitude of the impressed oscillations the final output of the detector which in turn amplifies as the square of the impressed voltage will be proportional to a high power of the voltage induced in the loop circuit and impressed on the input elements of the first tube. The exact power to which the voltage is raised is determined by the number of frequency doublers employed. Obviously this will result in a very great diminution in detector output voltage when the loop is removed from the position of maximum response a very slight amount or will result in a very great increase of detector output voltage when the loop is moved a slight amount from position of zero or minimum response.

A better understanding of the invention will be had from the following detailed description and therefore when read in connection with the attached drawing throughout which like reference characters indicate like parts and in which;

Figure 1 shows diagrammatically an arrangement of a receiver constructed in accordance with my invention;

Figure 2 shows an embodiment of Figure 1; while

Figure 3 shows the at present preferred form of my invention.

Referring in particular to Figure 1 the signal energy from the desired station is intercepted by means of the directional pickup and fed to a radio amplifier. This amplifier may or may not be used depending upon the requirements of the particular installation. The amplified radio energy is fed to a series of cascade frequency doublers and from there to the detector which includes in the output thereof an indicating device.

In Figure 2 which shows a circuit diagram of the apparatus shown diagrammatically in Figure 1 the energy is picked up by means of rotatable loop 1 tuned to the signal frequency by means of a variable condenser 2. This energy is fed to the input elements 3, 4 of a thermionic four element amplifier tube 5. The proper amount of amplification in this tube is assured by maintaining the grid electrode 3 of the tube 5 at the proper potential by means of a biasing battery 6. An output circuit having an inductance 7 and source of power 8 is connected between the output elements of the thermionic tube 5. Reaction between the output and input circuits of the amplifier stage is prevented by using a tube of that type in which a fourth shield element 9 is provided between the grid and plate electrodes. This electrode also serves the purpose of a variable volume control the amount of volume depending on the position of the tap to which the electrode is connected on the potentiometer 10 connected between a preselected point on the plate potential battery 8 and the negative terminal of the filament.

The inductance 7 in the output circuit of thermionic tube 5 is coupled to an inductance 11 in the input circuit of thermionic tube 12. This input circuit is tuned by means of a condenser 31 to the fundamental frequency. In order that tube 12 act as an efficient frequency doubler the proper potential is applied to the grid electrode thereof by means of a biasing battery 13. The output circuit of tube 12 is closely coupled by means of an inductance 14 therein to an inductance 15 in the input circuit of a thermionic tube 16. Potential is applied to the anode of tube 12 by means of a source of power 17 connected between the anode and cathode of tube 12. The input circuit of tube 16 is tuned by means of variable condenser 25 to double the frequency of the incoming signal. This stage as a result produces oscillations in the output circuit of tube 12 and consequently in the input circuit of tube 16 which vary as the square of the oscillations set up in the input circuit of tube 12.

The output circuit of thermionic tube 16 which includes inductance 18 and power source 19 is closely coupled by means of inductance 18 to an inductance 20 in the input circuit of a thermionic tube 21. In order that tube 16 operate as an efficient frequency doubler a biasing battery 22 is provided to maintain the grid electrode thereof at the proper potential. The input circuit of tube 21 is tuned by means of a variable condenser 23 in shunt with the inductance 20 to a frequency twice the frequency of the preceding tuned circuit 14, 15. In other words the frequency of the tuned circuit 20, 23 is four times the frequency of the signal to be received. Thermionic tube 21 is operated as a detector of the signal voltages by applying the proper potential to the grid electrode thereof by means of a biasing battery 24.

As is well known the amplitude of the voltage oscillations in the output circuit of a thermionic tube operating as a detector are substantially proportional to the square of the amplitude of the voltage oscillations in the input circuit thereof. Consequently when two stages operating as frequency doublers are used the amplitude of the voltage oscillations in the output circuit thereof are substantially proportional to the eighth power of the amplitude of the voltage oscillations impressed on the input circuit of the first voltage. An indicating apparatus, as for instance, a loudspeaker T is connected in the output circuit of the thermionic tube 21.

As will be readily seen when a receiver constructed in accordance with the present invention is used with any known directional aerial system, a small movement of the pickup device from position of maximum response will result in a great decrease in signal strength in the indicator T, or in case the point of zero response is being used a small movement of the pickup device from position of zero response in the indicator will result in a great increase in signal strength therein. The true direction of the source of energy can be readily found with my receiver associated with any known aerial system.

While, for purposes of illustration, two stages of frequency doublers have been shown it will be understood that the number of stages may be increased or decreased the exact number in each instance depending on the degree of amplification and consequently pointing accuracy required without departing from the spirit of the invention.

In Figure 3 is shown an arrangement which differs from Figure 1 in that this modification utilizes the well known heterodyne or beat method of reception. In this arrangement which is otherwise similar to Figure 2 a beat frequency is produced in the output circuit 27—28 of a thermionic tube M which serves as a frequency changer by means of an oscillation generator 25 coupled to an inductance 26 in the input circuit 1—2 of said tube the control electrode of M is maintained at the proper potential by means of a battery 29. Inductance 27 in the output circuit of M is closely coupled to inductance 1a in the input circuit of thermionic tube 5 which operates similar to thermionic tube 5 of Figure 2. The number of tuning controls required in the modification shown in Figue 2 is materially reduced by utilizing this method since the second, third and fourth stages may consist of intermediate frequency amplifiers which amplify at a fixed frequency. The first and second intermediate frequency stages have been shown as being tuned to the original beat or intermediate frequency while the third and fourth intermediate frequency stages are tuned to this frequency doubled and quadrupled respectively.

In view of the detailed description of the modification shown in Figure 2 it is thought that a detailed description of this modification which, except for the differences pointed out above, is similar in operation to Figure 2 is unnecessary. It will be noted, however, that in this case as in the preceding case the number of intermediate stages may be increased or decreased and the number of times the frequency is doubled may be increased or decreased without departing from the spirit of the invention.

Although for purposes of illustration I have shown the at present preferred form of my invention and the operation thereof it will be understood that I do not wish to limit myself thereby except as marked out in the claims appended hereto.

I claim:

1. In radio apparatus a rotatable directive aerial, an amplifier having an input circuit associated therewith, a frequency doubler stage having its input circuit associated with the output circuit of said amplifier and rectifying apparatus operatively associated with said frequency doubler.

2. In a rotatable frame receiver, a directive aerial, a plurality of cascade amplifier stages connected to said aerial, a plurality of cascade stages of frequency doublers associated with the output of said amplifier, and a rectifier associated associated with the output of said frequency doublers.

3. Radio apparatus comprising the combination of a loop aerial tuned to signal frequency, a thermionic tube having input elements connected to said loop aerial, means for producing oscillations at a frequency differing from the signal fequency by an intermediate frequency, means for coupling said last named means to said loop circuit, an amplifier tuned to the intermedate frequency coupled to the output circuit of said tube, a plurality of frequency doublers associated with said amplifier and detecting apparatus associated with said frequency doublers.

4. In combination, a directional antenna system of adjustable directivity, a local oscillator, means connected with said antenna system and said oscillator for amplifying a fixed frequency produced by combining said local oscillator with signal frequencies picked up by said antenna, a non-linear space discharge device, means for impressing said amplified fixed frequency voltage on said non-linear space discharge device, means for selecting from the output of said space discharge device a frequency which is a multiple of said fixed frequency, and indicating means operated by said multiple frequency.

WALTER van B. ROBERTS.

CERTIFICATE OF CORRECTION.

Patent No. 1,925,570.   September 5, 1933.

WALTER van B. ROBERTS.

It is hereby certified that error appears in the printed specification of the above numbered patent requiring correction as follows: Page 1, line 76, for "pipkup" read pickup; page 3, line 19, claim 2, for "rotatable frame" read directive and for "directive" read rotatable frame; and line 24, strike out the word "associated"; and that the said Letters Patent should be read with these corrections therein that the same may conform to the record of the case in the Patent Office.

Signed and sealed this 13th day of March, A. D. 1934.

F. M. Hopkins (Seal)   Acting Commissioner of Patents.